US009939346B2

(12) United States Patent
Jerez

(10) Patent No.: US 9,939,346 B2
(45) Date of Patent: Apr. 10, 2018

(54) MULTI-FUNCTION LIQUID LEAK DETECTOR AND ANALYZER

(71) Applicant: Watersource Technologies, LLC, Pleasanton, CA (US)

(72) Inventor: Owen Jerez, Pleasanton, CA (US)

(73) Assignee: WATERSOURCE TECHNOLOGIES, LLC, Pleasanton, CA (US)

(*) Notice: Subject to any disclaimer, the term of this patent is extended or adjusted under 35 U.S.C. 154(b) by 182 days.

(21) Appl. No.: 14/835,630

(22) Filed: Aug. 25, 2015

(65) Prior Publication Data

US 2017/0023434 A1   Jan. 26, 2017

Related U.S. Application Data

(60) Provisional application No. 62/195,186, filed on Jul. 21, 2015.

(51) Int. Cl.
   *G06F 19/00*   (2018.01)
   *G01M 3/28*    (2006.01)
   *E03B 7/00*    (2006.01)

(52) U.S. Cl.
   CPC ........... *G01M 3/2815* (2013.01); *E03B 7/003* (2013.01)

(58) Field of Classification Search
   CPC combination set(s) only.
   See application file for complete search history.

(56) References Cited

U.S. PATENT DOCUMENTS

| | | | | |
|---|---|---|---|---|
| 5,409,037 A | * | 4/1995 | Wheeler | G01M 3/243 137/487.5 |
| 6,057,770 A | * | 5/2000 | Justesen | G01M 3/18 340/514 |
| 6,691,724 B2 | * | 2/2004 | Ford | E03B 7/071 137/1 |
| 8,172,154 B1 | * | 5/2012 | Figley | F24F 11/0015 165/223 |
| 2004/0134545 A1 | * | 7/2004 | Ford | E03B 7/071 137/624.11 |
| 2006/0168611 A1 | * | 7/2006 | Fima | E03B 1/00 725/10 |
| 2006/0191323 A1 | * | 8/2006 | Garabedian | F17D 5/06 73/40 |
| 2015/0051743 A1 | * | 2/2015 | Darnold | A01G 25/16 700/284 |

FOREIGN PATENT DOCUMENTS

EP   0252131 A1 * 1/1988 ............. G05B 15/02

* cited by examiner

*Primary Examiner* — Kidest Bahta
(74) *Attorney, Agent, or Firm* — Maryam Imam; Klintworth & Rozenblat IP LLP

(57) ABSTRACT

A method of monitoring liquid flow includes monitoring liquid flow including the pressure of the liquid, through a slave analyzer device, reporting the monitoring results to a processor configured to control a master analyzer device to adjust the liquid flow and pressure. Periods of usage and periods of non-usage of the liquid are detected by the processor. Subsequently, based on the detected periods of usage and periods of non-usage are used for learning a pattern associated and based upon the learned pattern, the liquid flow is automatically controlled by stopping the liquid flow during expected non-usage periods of time and turning the liquid flow on during expected usage periods of time.

11 Claims, 13 Drawing Sheets

US 9,939,346 B2

MULTI-FUNCTION LIQUID LEAK DETECTOR AND ANALYZER

CROSS REFERENCE TO RELATED APPLICATIONS

This application claims priority to U.S. Provisional Application No. 62/195,186, filed on Jul. 21, 2015, by Owen Jerez, and entitled "MULTI-FUNCTION LIQUID LEAK RATE ANALYZER".

BACKGROUND

Water conservation has been a concern practically ever since the existence of mankind. Various areas of the earth are fortunate enough to benefit from ample rainwater while others are hardly so fortunate and live in dry land and deserts. In the last couple of decades, people have experienced a notable change in climate with some areas, such as California, USA, becoming dry. Needless to say, water shortage causes a multitude of issues not least of which are farming, lawns and drinking water, among a slew of others too numerous to list.

Conservation of water has experienced less than rapid growth. Currently, such systems attempt to collect rain water and rather minimally filter it for use in farming. While this method of water conservation is helpful, it nevertheless offers limited relief. Besides, in and areas, water fall is generally infrequently experienced otherwise, water shortage would be less of an issue. Further, water is too readily wasted, as evidenced by the current rate of water in residential and commercial buildings in the US being 30% just to water leaks alone. As a result of such leaks, water simply goes to waste. No attempt is currently made to preserve water. A leak is typically rather small when it first surfaces but with the passage of time, the leak grows significantly and results in greater water loss over time. Perhaps even more importantly, large leaks typically cause other types of damage, such as corrosion of pipes and destruction of wood. A horrific outcome of damage is mold accrual leading to safety hazards.

Water is merely one of host of other liquid that has potential for causing major problems when leaked or used inefficiently. Oil, Liquid Natural Gas (LNG), and Distillates are but a few examples.

Thus, there is a need for a system and method for a more effective liquid conservation.

SUMMARY OF THE INVENTION

Briefly a method of monitoring liquid flow is disclosed. The method includes monitoring liquid flow including the pressure of the liquid, through a slave analyzer device, reporting the monitoring results to a processor configured to control a master analyzer device to adjust the liquid flow and pressure. Periods of usage and periods of non-usage of the liquid are detected by the processor. Subsequently, based on the detected periods of usage and periods of non-usage are used for learning a pattern associated and based upon the learned pattern, the liquid flow is automatically controlled by stopping the liquid flow during expected non-usage periods of time and turning the liquid flow on during expected usage periods of time.

These and other features of the invention will no doubt become apparent to those skilled in the art after having read the following detailed description of the various embodiments illustrated in the several figures of the drawing.

IN THE DRAWINGS

DETAIL DESCRIPTION OF SOME OF THE EMBODIMENTS

Figure 1:
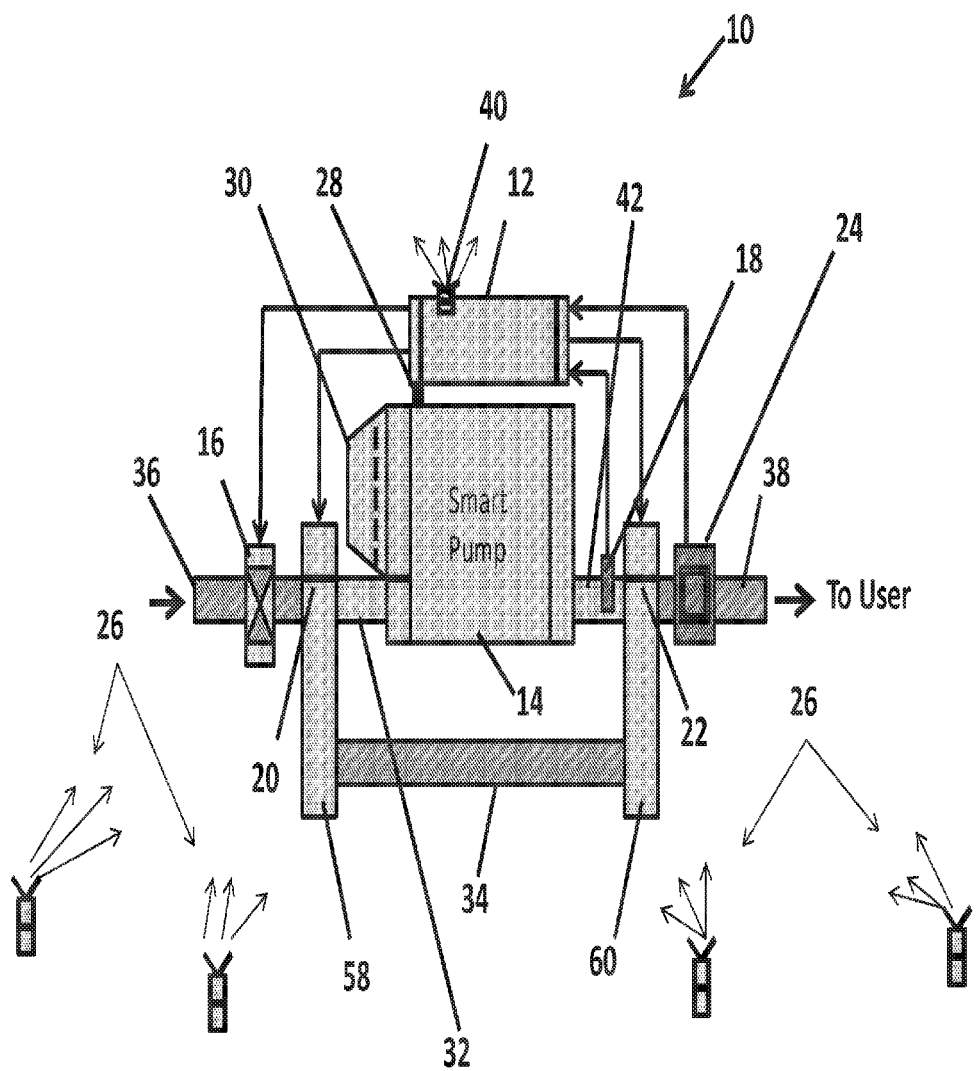
FIG. 1 shows a liquid leak rate analyzer 10, in accordance with an embodiment of the invention.

Referring now to FIG. 1, a liquid leak rate analyzer device 10 is shown, in accordance with an embodiment of the invention. The analyzer device 10 is shown to include a central processing unit 12, a smart pump 14, an ingress valve 16, a digital pressure sensor (DPS) 18, bypass valve 20 and egress valve 22, meter 24, pipes 32, 34, 36, 38, 58 and 60, an interface printed circuit board (PCB) 28.

The analyzer device 10 is shown to be remotely communicative with one or more remote leak detector analyzer devices 26. Each of the devices 26 detect and (optionally) analyze leaks, much like the analyzer device 10, with the exception of the capability to perform pressurized leak testing. They are therefore somewhat less sophisticated than the device 10 making them less costly allowing a user to utilize an adequate number of them, each in a different location, which allows for a wider scope of area with leak-detection.

An exemplary configuration and application of the devices 10 and 26 is where the device 10 is designated as a master device and the various devices 26 are remotely located and serve as slave devices to the master device. To this end, each of the devices are placed at a different location. Obviously, the more devices 26, the wider the area being monitored for leaks. As slave devices, the devices 26 report to t the device 10 and are controlled and perhaps even optionally programmed by the device 10.

In FIG. 1, the analyzer device 10 is shown to be in a bypass mode with liquid travelling the path described below.

In an embodiment of the invention, the smart pump 14 is an intelligent pump and has the capability to communicate with the CPU 12 through the interface PCB 28. More specifically, the CPU 12 interacts with the pump 14, through the interface PCB 28, to a relay inside of the pump 14. The pump's relay is turned on/off under the control of the CPU 12. This relay is typically located in a power distribution assembly within the pump 14 and may be a direct current (DC) power supply, relay, fuse or any other suitable mechanism for turning the pump 14 on and off. The pump 14 may be a check valve or a pressure tank. In the embodiments to follow, the pump 14 is presumed to include a tank for holding the liquid.

In an embodiment of the invention, the regulator 16 is a digital liquid pressure regulator. In accordance with an embodiment of the invention, the meter 24 is a digital water meter (DWM), the valves 20 and 22 are each multi-way solenoid valves, and the CPU 12 is a general purpose processor such as without limitation, the well-known Intel x86 series processors, made by Intel, Inc. of Santa Clara, Calif. Alternatively, the regulator 16 and the meter 24 may each be analog. Still alternatively, the valves 20 and 22 may be other than solenoid, such as a Normally Open valve, a 3-way relay valve that has a position indicator, such as an open or close sensor, or a manual position lever to open the valves in case of a relay failure.

The devices 26 may be placed in various locations, away from the smart pump 14, and at specific locations with most probable leak-occurrences, such as in close proximity of a pool, in a kitchen/bathroom, and/or wherever there is plumbing. In some embodiments, the devices 26 are smart devices that not only remotely and wirelessly help detect leaks, they, for example, report back to a master device, such as the device 10 with each report based on the same or a different set of criteria, as specified by the user. Yet alternatively, as smart devices, the devices 26 may perform some analysis themselves.

In the embodiment of FIG. 1, meter 24 sends digital data to the CPU 12. The regulator 16 sets a nominal pressure of the liquid sought to be analyzed and that is suitable for the particular liquid, application, and condition in which the analyzer device 10 is utilized. In bypass mode, the valves 20 and 22 are set to an 'open' position allowing liquid to travel through from the pipe 58, down to and through the pipe 34, up the pipe 60 and out through the pipe 38 ultimately reaching the user. The reason the liquid is able to travel up the pipe 60 is due to the pressurization of the pump 14. That is, liquid travels through pipe 60 toward valve 22 to bypass the pressure testing system, i.e. pump (and tank) 14. Both valves 20 and 22 are in an 'open' position allowing the liquid to travel through the pipe 58, the pipe 34, and the pipe 60 and ultimately to the user therefore bypassing the pressurization system, or pump 14.

The devices 26 communicate with the transceiver 40 to sense and report back status of leaks. In applications with remote leak detection capability, the transceiver 40, which alternatively may be a part of the CPU 12 or may reside externally and in close proximity to the CPU 12, is in remote communication with the devices 26 and wirelessly communicates the presence of a detected leak to the CPU 12. The CPU 12 responsively sets the position of the valve 20 (to 'on' or 'open' or 'off' or 'closed') and the setting of the regulator 16.

The pump 14 typically collects and stores the liquid for various purposes, such as without limitation, liquid preservation, and in bypass mode is bypassed by the liquid, as noted earlier. In fact, the position of the valves 20 and 22, at least in part, determines the mode of the device 10, i.e. bypass or otherwise. The meter 24 monitors or measures the liquid pressure through the pipe 38, upon passing of the liquid through or beyond, as the case may be, the valve 22.

Control of the valves 20 and 22 is largely digitally performed through the CPU 12. For example, the valve 20 is caused to open or close under the control of the CPU 12, as is the regulator 16. To this end, the CPU 12 masterminds the operation of the device 10. Upon an 'open' position of the valve 20, the liquid flows from the pipe 36 to the pipe 58 and upon an 'open' position of the valve 22, liquid flows from the pipe 34 through the pipe 60, to the meter 24 and through the pipe 38. Closure of the valve 20 results in isolation of the user from a leak.

During bypass mode, liquid is directed from the valve 20 through the pipe 34 and onto the valve 22, thus, avoiding collection thereof in the pump 14. On the other hand, in non-bypass mode(s), liquid travels from the valve 20 through the pipe 32 and to the pump 14 where it is collected. The pump 14 is shown to have a pump motor used to pressurize the pump 14. Further included in the pump 14 is a tank for maintaining the liquid collected during non-bypass mode.

The sensor 18 senses the presence or absence of liquid through the pipe 42 and reports the same to the CPU 12. Further reported to the CPU 12 is the output of the meter 24, which measures the pressure through the pipe 38 and reports the measured pressure, in digital form, to the CPU 12.

As shown in FIG. 1, the device 10 has a feedback path either through the bypass pipe 34 or the pump 14, to the CPU 12 and back to the regulator 16, therefore allowing it to efficiently preserve liquid and to supply the user with liquid when required. Accordingly, liquid waste and damage, due to leaks, no matter how small, is identified, reported, and acted upon at the leak's initial stages before the leak becomes large and potentially dangerous. Moreover, as earlier discussed, the user is shielded from the leak while receiving liquid from the pump 14.

Quantifiable data relating to the leak may be provided for analysis, historical data or otherwise. Interaction with the user is provided for adjusting, stopping or starting the flow of liquid, which allows for a flexible and adaptable liquid management system.

Moreover, the CPU 12 is programmed to enable the device 10 to be self-learning for a variety of reasons, too numerous to list all herein, but one of which is budgeting. Remote detection of leaks allows for the device 10 to be placed in a location well suited or feasible for such a device while devices 26 are positioned in more delicate or smaller locations that cannot readily house the relatively larger device 10 itself.

Examples of liquids that may be candidates for various embodiments and methods of the invention include, without limitation, water, oil, Liquid Natural Gas (LNG), Distillates, or practically any other type of liquid.

Among various applications, several applications of the device 10 using the foregoing list of liquids or any other suitable liquid is metering, sub-metering, ascertaining flow fluctuations, monitoring unexpected pressure changes, detecting and analyzing complex environment leaks, deviations thereof. Further, the device 10 may be used in any liquid regulation or delivery system and further may be coupled in parallel and or series in any liquid regulation or delivery system. In an exemplary embodiment, a number of the devices 10 can be configurably connected together in-series or in parallel. In a series configuration, a number of devices 10 may be placed far apart, for instance, every ten kilometers, in a pipeline to check for contiguous operation during normal operation, to check for 100% verification of system performance during dwell times, or to check the integrity of operation by isolating segments of a pipeline and varying the pressure in those segments while monitoring performance thereof. Thereafter, a comparison of the monitored performance can be done against historical performance, as one of many other useful metrics.

Water conservation has become an increasing challenge to the world with resources diminishing every year as droughts are unfortunately on the rise. California is currently experiencing one of the most serious droughts ever faced in its history. Water from gutters or rain can be easily collected and filtered and even analyzed for various reasons. Water budgeting is of particular interest in light of decreasing water supplies. For example, water may be made to flow through the pipe 38 during times when a family is at home and in need of water usage and automatically shut off during times when the family is not in the house, i.e. on vacation.

In some practical applications, the device 10 may be placed in a remote location from the family's house, such as a centralized location serving many users while monitoring/analyzing/managing water at the user's residence or place of business. Another application is that of farmers where water conservation arguable even more important. Spotting leaks before they become major problems vital. Yet another application is oil drilling, among a host of others too numerous to list and/or conceive.

Figure 2:
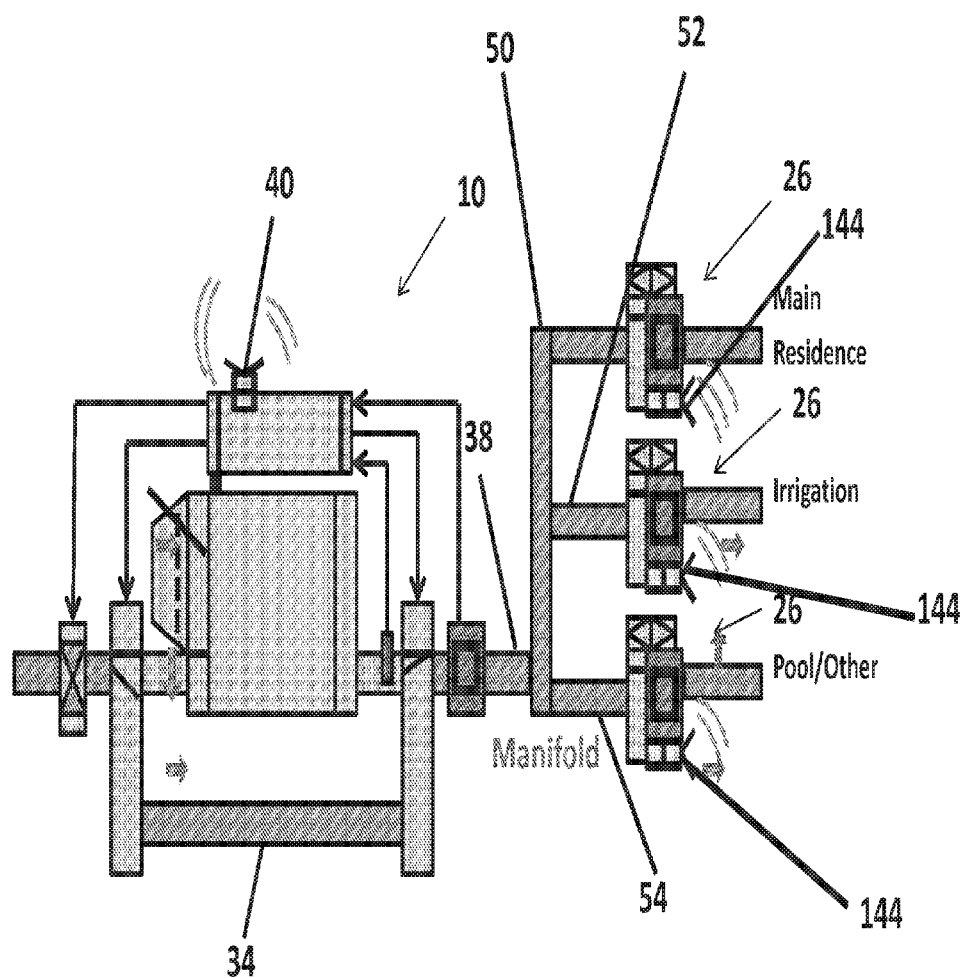
FIGS. 2-4 show exemplary applications of the device 10, in accordance with various embodiments and methods of the invention.

FIG. 2 is an exemplary application of the device 10, in accordance with an embodiment of the invention. The device 10 monitors three zones simultaneously, such as without limitation, the main residence, the irrigation, and the pool or other areas through the communicative coupling of the devices 26 and the device 10. More specifically, the transceiver 40 of the device 10 relays information to and from a transceiver 144 of each of the devices 26 wither wirelessly or through a wire connection. Each zone is therefore connected to a single device 10, and thus, monitored and pressure-tested when needed by a single device 10.

In the illustrative embodiment of FIG. 2, each of the devices 26 are installed in pipes that lead to their ultimate monitored destinations, i.e. pipes 50, 52 and 54. While three zones shown in FIG. 2, other number of zones may be monitored.

In accordance with various embodiments of the invention, wireless communication between the transceiver 40 and each of the devices 26 may be established through a WiFi device that is a water meter that is a two-way solenoid valve with a battery pack.

Figure 3:
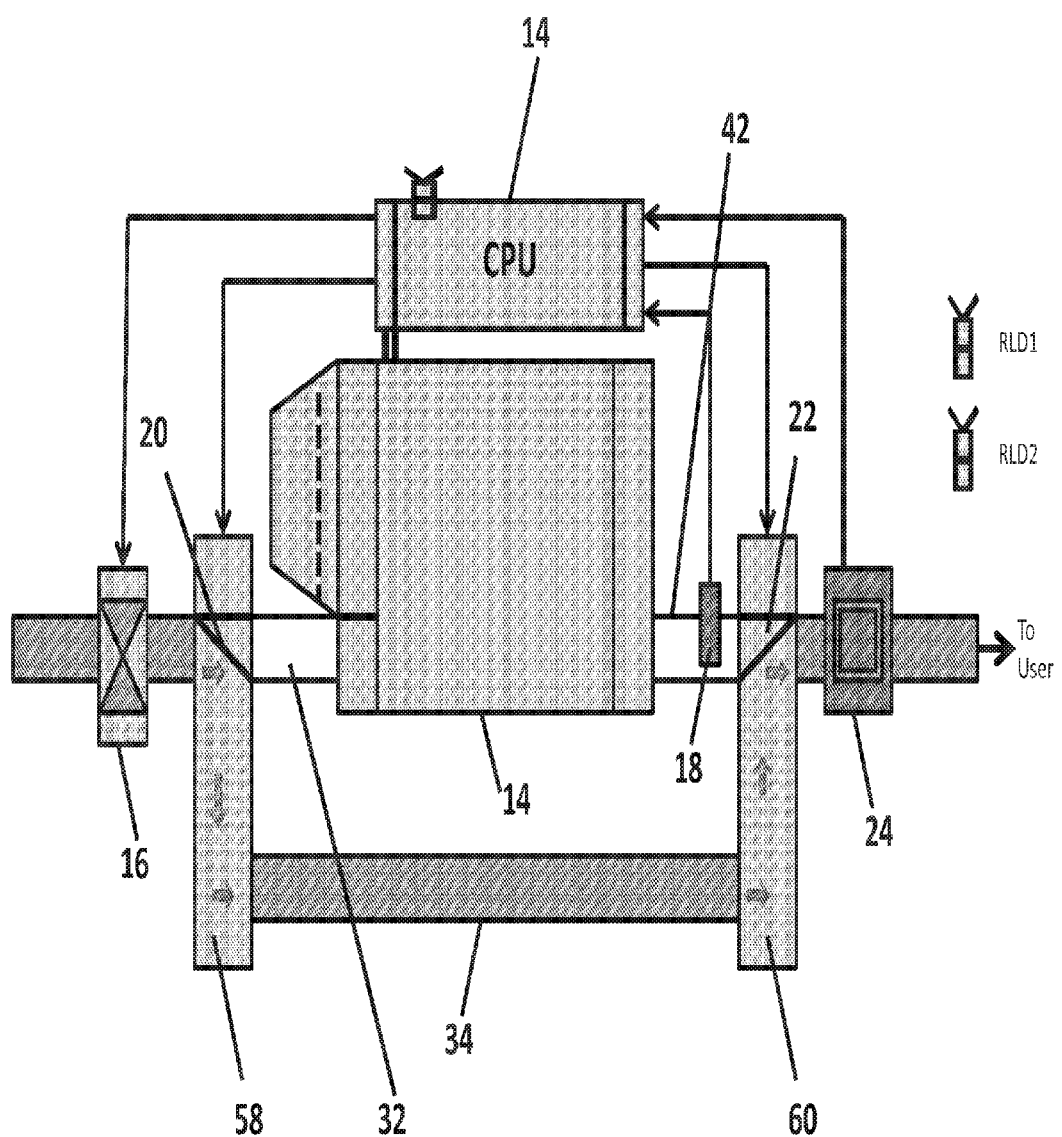

FIG. 3 shows device 10 in a mode, in accordance with yet another embodiment and method of the invention. The direction of liquid is shown with arrows through the pipe 58 and the pipe 60. The device 10 is in a bypass mode starting with a pressurizing mode where the valve 20 is in an initial open position whereas the valve 22 is in a closed position with the tank 14 being in an 'on' position. The sensor 18 reads the pressure in the pump 14 and upon reaching a desired pressure, as noted by the sensor 18, the CPU 12 causes the pump 14 to close. Accordingly, the valve 20 is caused to close by the CPU 12, the valve 22 is caused to open and the meter 24 and the sensor 18 send data to the CPU 12 for analysis. Upon the presence of a major leak, the valve 20 is closed and liquid is preserved in the pump 14 and liquid is budgeted through regulation by the regulator 16.

Figure 4:
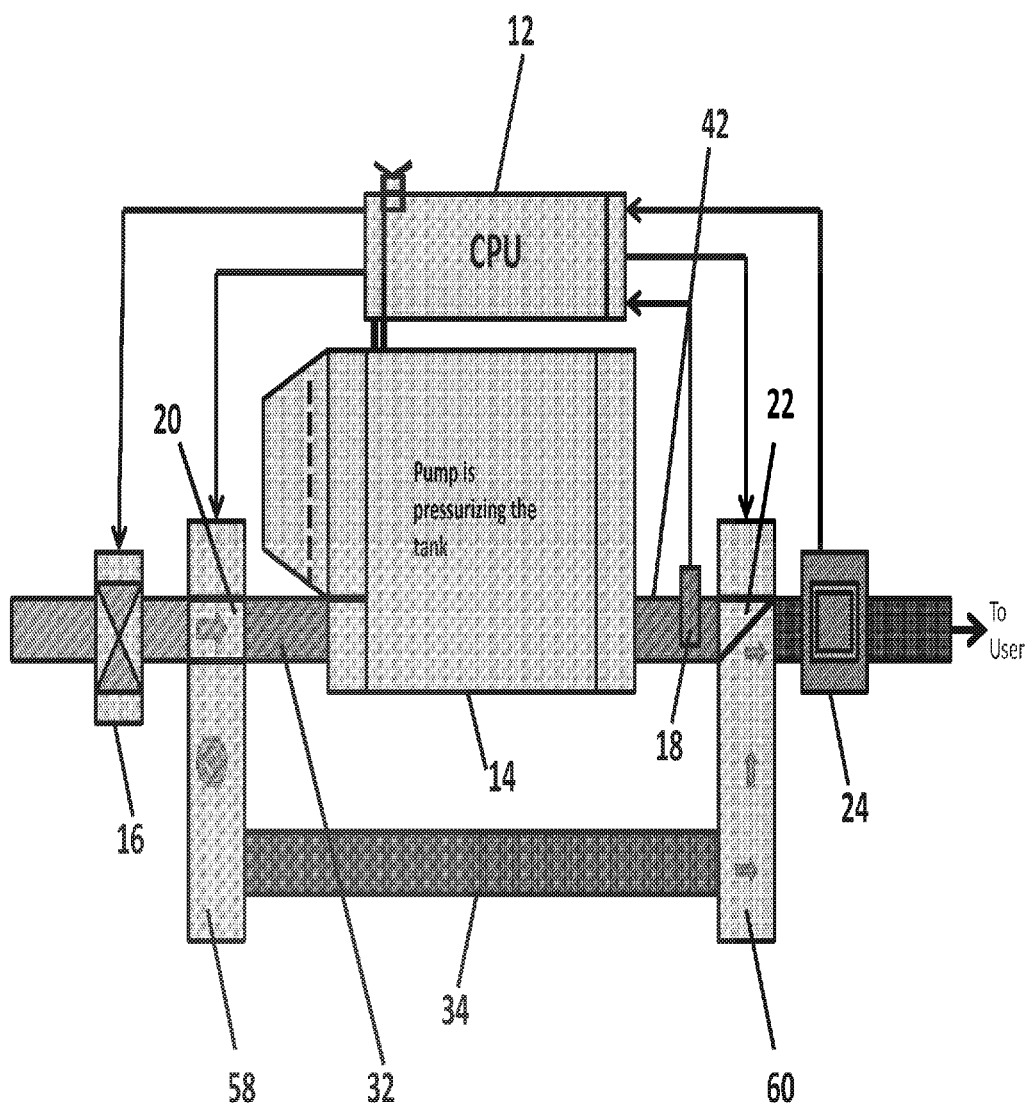

FIG. 4 shows device 10 in a mode, in accordance with another embodiment and method of the invention. In the embodiment of FIG. 4, the state of the device 10 is going from that of FIG. 3, i.e. bypass, to pressurizing using the tank 14. Initially, the valve 20 is open and the valve 22 is closed, the tank 14 is on and the sensor 18 reads the pressure. The desired pressure is reached, as noted by the sensor 18 causing the tank/pump 14 to stop, i.e. the set pressure, noted by the sensor 18, stops the pump. This completes pressurization. Next, analysis begins by closing the valve 20 and opening the valve 22. The meter 24 and the sensor 18 send data to the CPU 12 accordingly. Upon the detection of a leak from the recordings by the sensor 18, the valve 20 is closed and the regulator 16 dynamically regulates the pressure. It is noted that the valve 22 is open to bypass thereby isolating the user.

Figure 5:
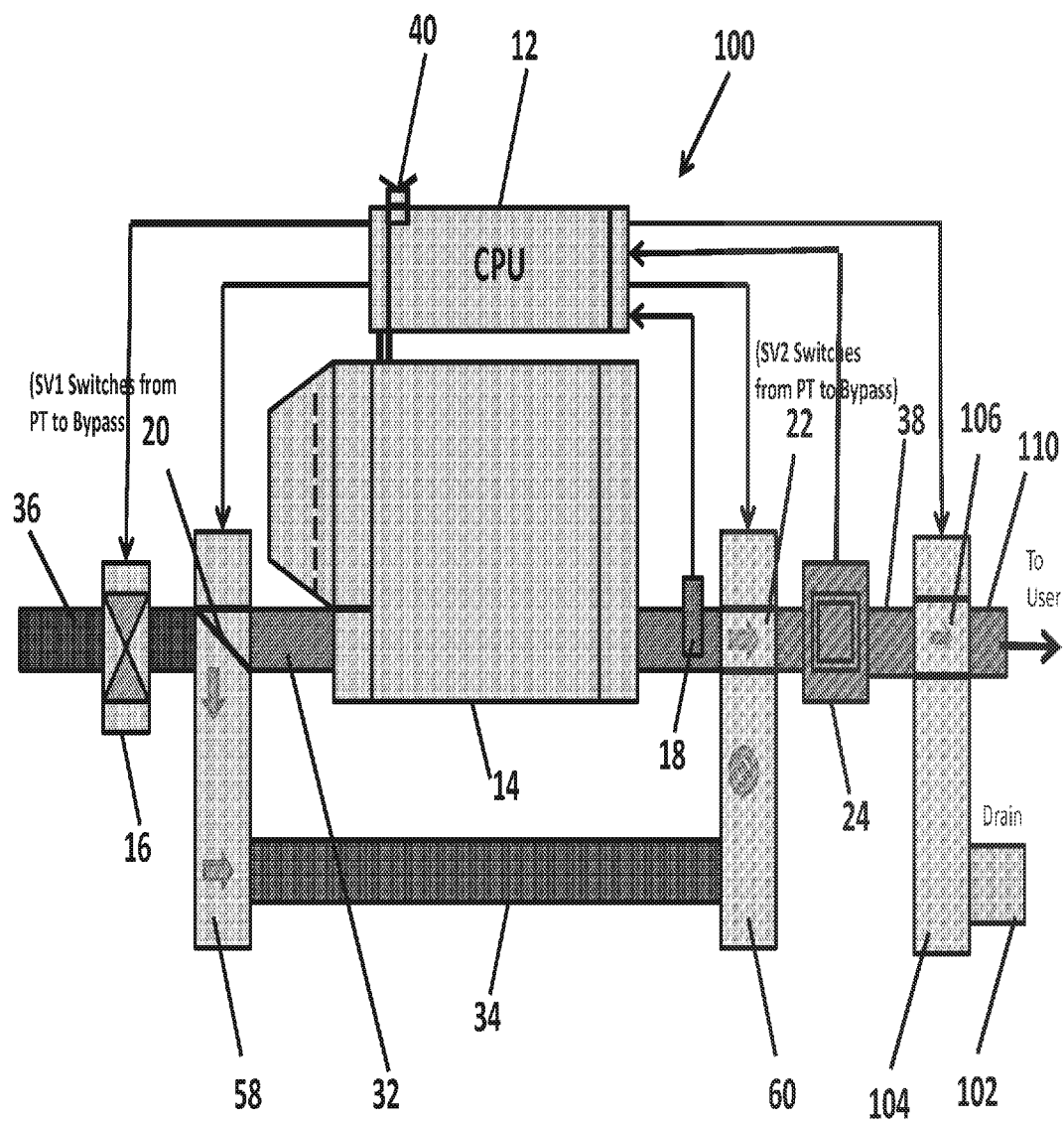
FIG. 5 shows an analyzer device 100, in accordance with another embodiment of the invention.

FIG. 5 shows an analyzer device 100, in accordance with another embodiment of the invention. The device 100 is analogous to the device 10 except that the device 100 includes an optional drain 102, which is connected to the pipe 104 and the pipe 104 is a direction the liquid travelling through the device 100 can take, or not, based on the position of the valve 106. The valve 106 is shown to be controlled by the CPU 12. In this respect, not only a leak can be detected such as discussed above relative to the device 10, undesirable liquid can be drained before finding its way to the user. The device 100 is shown to output liquid through the pipe 110. The pipe 110 is connected to other devices in certain settings, as discussed further below.

In the embodiment of FIG. 5, water leak rates are analyzed for the detection of leaks under controlled conditions. A specific volume of the liquid at a specified (predetermined) pressure is reached and maintained. As with prior figures, arrows through the valves 20, 22, and 106 as well as the pipes 58, 34, 60, and 104 conceptually show the path the liquid travels before reaching the user.

Initially, pressurization is done by opening the valve 20, closing the valve 22, and maintaining the pump 14 'on'. The DPS 18 reads the liquid pressure and when the desired or specified pressure is reached, pumping of the liquid into the tank 14 is stopped. Pressurizing is therefore done at this point and analysis begins. During analysis, the valve 20 is closed and the valve 22 is opened. The DWM 24 and the DPS 18 send data to the CPU 12. The data sent by the DWM 24 and DPS 18 to the CPU 12 includes readings (or measurements) from the DWM 24, readings (or measurements from the DPS 18, and readings (or measurements) from the DWPR 16.

The CPU 12 controls the DWPR 16, all valves, pump motor and communication to (or from as the case may be) the user or to and from the cloud, or both. If a leak exists, pressure will not be stable (declining pressure) and the flow rate will not be stable (existence of flow during test). The pressure and flow of the liquid is therefore sensed by the Digital Pressure Sensor (DPS) 18 and the Digital Flow Meter (DFM) 24 and should be below that which is normally expected in the absence of a leak. This is reported to the CPU 12 to signal a leak. Upon detection of a leak, the CPU 12 causes the valve 20 to close in order to isolate the user from the leak.

Under the control of the CPU 12, the DWPR 16 dynamically regulates the liquid's pressure during normal operation. In an embodiment of the invention, the valve 20 is a 3-way Solenoid valve "SV1", and opened helping to direct the liquid from the intake, i.e. pipe 36, through the bypass pipe, i.e. pipe 58, and accordingly causing the direction of the liquid to travel through the pipes 34 and 60 and through to another 3-way solenoid valve, "SV2", i.e. valve 22, and ultimately onto the user (or the user's house). During normal operation, the pressure pump and tank 14 is therefore bypassed and instead used for pressure testing.

Figure 6:
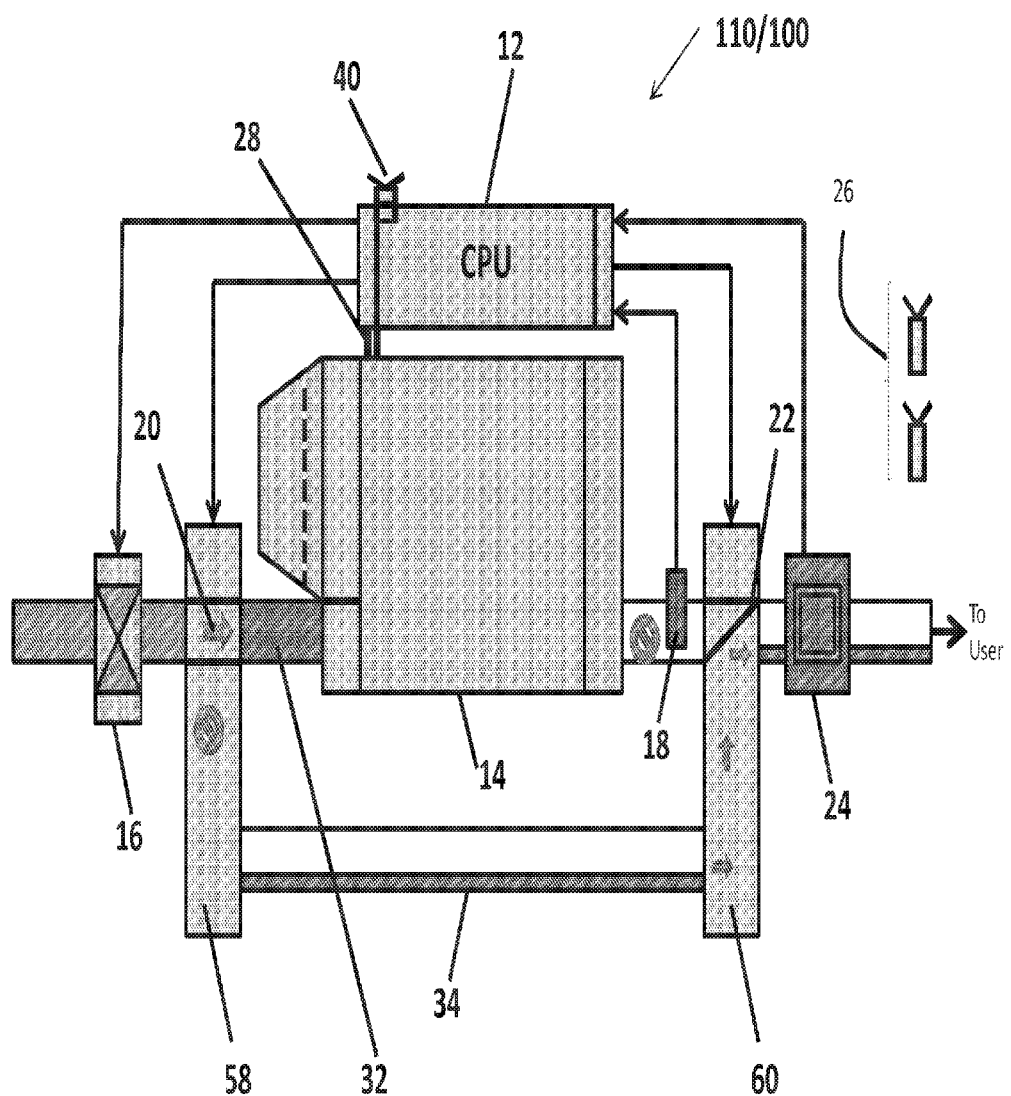
FIG. 6 shows deactivation of the pump 14, in the device 10 or 100, to isolate the user from the detected leak of the embodiment of FIG. 5, in accordance with an embodiment and method of the invention.

FIG. 6 shows activation of the pump 14, in the device 10 or 100, to isolate the user, in accordance with an embodiment and method of the invention. During pump/tank pressurization, the valve 20 is opened while the valve 22 is closed. During leak detection testing, the valve 20 is closed and the valve 22 is opened thereby applying liquid pressure other than feed liquid pressure to the system under test. During the pressure test, DWM 24 and the DPS 18 send data read by the DWM 24 and the DPS 18 to the CPU 12. During analysis, the valve 20 remains closed and the valve 22 remains open. During analysis, the CPU 12 determines the proportional change in the leak rate under higher liquid pressure.

Upon the leak becoming a major leak, the valve 20 closes to isolate the user from the leak by cutting off the liquid's path at the output of the regulator 16. Therefore, the liquid travels the valve 20 and pipe 32 but not through pipe 58. Additionally, the pump 14 is not activate, per actions of the CPU 12. The regulator 16 dynamically regulates the pressure of the liquid therefore budgeting the liquid. That is, the pump motor 28 stops operating when the DPS 18 detects a predetermined pressure, not based on the amount of liquid volume in the tank of the pump 14 and rather by detecting reaching a specific pressure level. Simply put, the pump motor 28 turns on until the pressure sensor reads "X" pressure, then it turns off. The specified value can be programmed by the CPU 12. In the case of the liquid being water, this is particularly useful for budgeting purposes during droughts.

In an embodiment of the invention, the leak is at a remote location relative to the device 10 where it is detected and reported back to the CPU 12 by one or both of the DEVICEs 26 through the transceiver 40.

Figure 7:
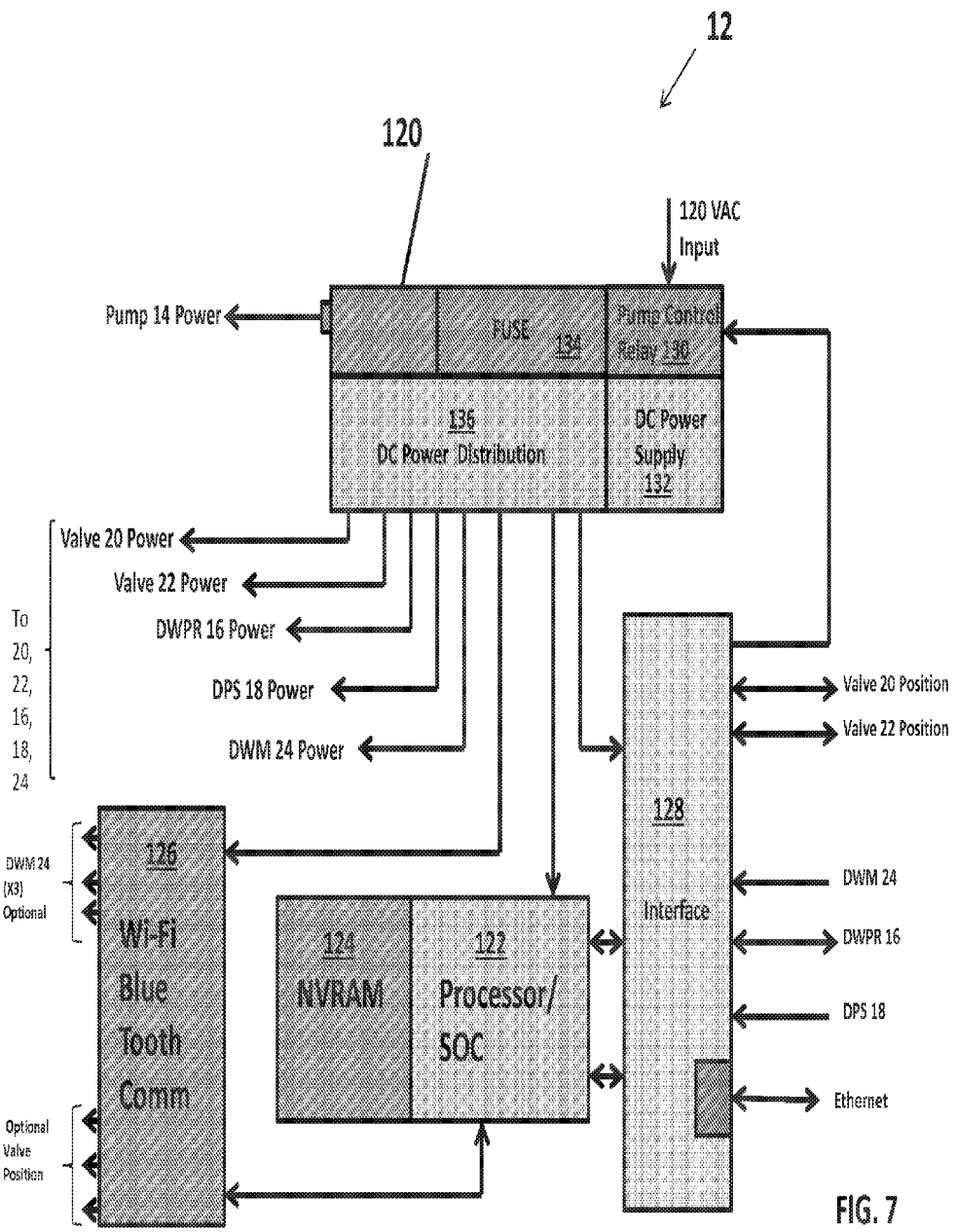
FIG. 7 shows further details of the CPU 12, in accordance with an embodiment of the invention.

FIG. 7 shows further details of the CPU 12, in accordance with an embodiment of the invention. The CPU 12 is shown to include a power controller 120, a processor 122, a nonvolatile memory (NVRAM) 124, a wireless communication device 126 and an interface 128. The controller 120 is shown to include power control relay 130, a direct current (DC) power supply 132, a fuse 134 and a DC power distribution block 136.

The NVRAM 124 may be any kind of suitable nonvolatile memory, such as flash. The processor 122 may be a silicon-on-chip (SOC), and the wireless communication device 126 may be a Bluetooth or WIFI device.

The power controller 120 receives an input that is typically an alternating current (AC) voltage (VAC) of 120 volts, which is applied to the power control relay 130 of the controller 120. The relay 130 is a high-powered device whose output cannot be used by the digital circuits of the device 10. Therefore, in cooperation with the power supply 132, the relay 130 convert AC input to the relay to DC, used as a power supply, i.e. DC power supply 132 for supplying a proper power to the blocks of the device 10. Accordingly, the DC power distribution block 136 supplies various devices, such as the valves 20 and 22, the DWPR 16, the DPS 18 and the DWM 24 with the DC power generated by the DC power supply 132.

The interface 128 serves as the liaison between the various structures of the device 10 and the processor 122. For example, input and output goes to each of the valves 20 and 22 by the processor 122, input is received from the DWM 24, as it reads the pressure of the liquid, input and output are between the processor 122 and the DWPR 16, input is received from the DPS 18 and input/output is communicated through Ethernet to other structures of the device 10.

The device 10/100 can work in several of the following modes: 1) Pure standalone where it only communicates with the user's cell phone or by a mobile device, such as a tablet, through the user's local WiFi or through an Ethernet cable system where a cable is plugged in the event the user does not have wireless access; 2) User permitting, the device reports data used to determine the presence of a leak to a cloud server, subsequently, the data is analyzed and the user receives report(s) of liquid usage and related information as well as software upgrades over the house WiFi or via an Ethernet cable; and a control system, "Swarm Control", where all of the systems are controlled from the cloud server through WiFi or Ethernet plug-in, where all of the installed slave leak detector analyzers 26 are simply drones.

The processor 122 communicates wirelessly through the device 126. In an embodiment of the invention, the device 126 is the transceiver 40. An example of a wireless communication means is Bluetooth. The processor 122 saves data to and retrieves it from the NVRAM 124.

Figure 8:
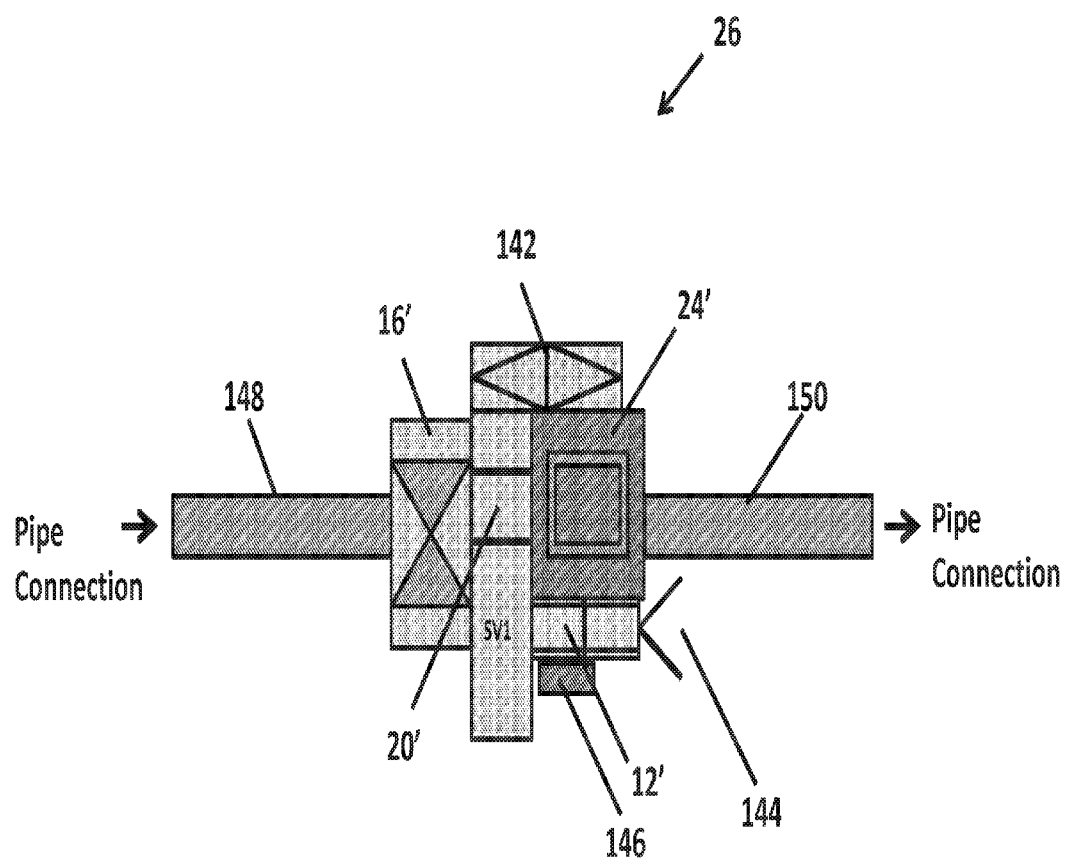
FIG. 8 shows further details of one of the devices 26, in accordance with an embodiment of the invention.

FIG. 8 shows further details of one of the devices 26, in accordance with an embodiment of the invention. The device 26 is analogous to the devices 10 and 100 except it is incapable of perform pressurization testing. Thus, the device 26 includes a number of devices that the devices 10 and 100 have. For example, DWPR 16', valve 20', DWM 24' and CPU 12' of device 26 have analogous counterparts in each of the devices 10 and 100. Additionally, the device 26 includes pipes 148 and 150, a power supply 142 and transceiver 144, wireless or wired connection, and an optional humidity sensor (HWDS) 146.

The (remote sensing) device (RSD) 26 is installed within a structure or a pipe via its pipes 148 and 150, where a leak is to be detected. The power supply 142 generates either alternating current (AC) or direct current (DC) power to the remaining components of the device 26 that operate electrically, such as the CPU 12', the DWPR 16', the valve 20', the transceiver 144 or alternatively an Ethernet port.

In an embodiment of the invention, the valve 20' is normally an open, two-way solenoid type of valve. Upon the detection of a severe pressure and flow-rate change in the liquid traveling through the device 26, as detected by DWM 24 and DWPR 16, which reports its findings to the CPU 12', a sudden leak is noted and the valve 20' is closed by the CPU 12 thereby isolating the remainder of plumbing, beyond the device 26, from the detected leak. During regular operation, liquid comes in at the connection of the device 26 and an end of a device undergoing leak detection, through the pipe 148 and the valve 20' is opened allowing the liquid to travel through the DWM 24' and out through the pipe 150, which is connected to an opposite end of the device undergoing leak detection. One of the functions of the transceiver 144 is to allow the device 26 to communicate with another remotely-located device, such as the device 10 or 100. Alternatively, the device 26 uses the HMDS 146 to monitor humidity and report a notable change thereto to the CPU 12'. An exemplary application is using the device 26 in a wall for the purpose of detecting change in humidity, which suggests the presence of mold or other undesirable conditions.

In addition to leak detection, the device 26 performs many other useful functions, such as reporting changes in the liquid pressure during certain periods of time by the user. An example of the foregoing is detection of lack of pressure, i.e. no liquid flow through the device 26, at times when the user is either out or for some reason, not using the liquid. Another detection and reporting is identity of the persons using a plumbing system, such as family members of a household having installed the device 26 in their faucet plumbing, detecting, over time, who is using the faucet. Through the CPU 12' and memory coupled or included thereto, the device 26 notes, in suitable intervals of time, the increase in pressure, when the faucet is turned on and/or the decrease in pressure when the faucet is turned off and develops signatures accordingly. Through time, a pattern typically arises of the change in pressure and the pattern is used to create a signature, which effectively identifies a particular family member. Reporting of various information or data is typically done by the CPU 12' and transmitted through the connection 144 for further analysis or collection by a device such as 10/100. The applications of the devices 26 and 10/100 are too numerous and wide in scope to list herein; suffice it to say, the number of applications are nearly infinite.

It should be noted that the functions performed by the device 10 herein equally applies to device 100 and vice versa, unless stated otherwise.

Figure 9:
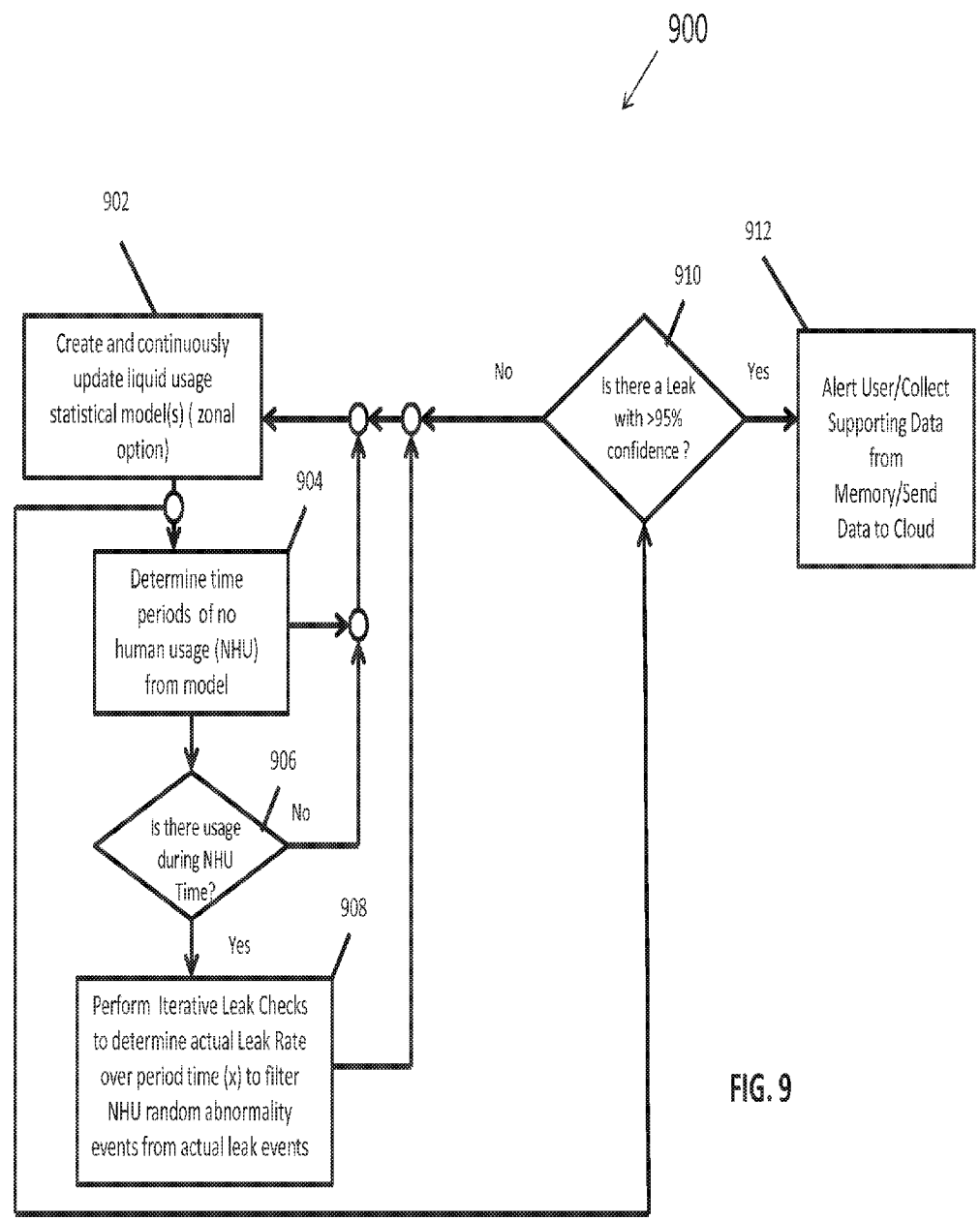
FIG. 9 shows a flow chart 900 of some of the steps performed by the CPU 12 or the CPU 12'.

FIG. 9 shows a flow chart 900 of some of the steps performed by the CPU 12 or the CPU 12'. At step 902, liquid usage statistical model(s) are created and used throughout the use of the device 10 or the device 26. Optionally, a statistical model is created and utilized for each zone being monitored to further detail the statistical model as each zone may be different due to environment and perhaps other factors.

Next, at step 904, time periods of no-human-use (NHU) are detected and at 906, a determination is made as to whether or not there is usage of the liquid during NHU times. If this determination yields there are, the process proceeds to step 908 otherwise, the process goes back to step 902 and repeats from thereon.

At step 908, leak checks are performed iteratively to determine the actual leak rate over a period of time (x) to filter NHU random abnormality events from the actual leak events. A leak that is due to a small hole in a pipe is an example of the latter and a pipe bursting is an example of the former. After step 808, the process returns to step 902 and resumes from there.

After step 902, the process may proceed to 910 for those embodiments and methods where a degree of confidence level is attached to the detection of the leak. If at 910, it is determined that there is more than a 95% chance of an existing leak, the user is alerted at step 912 and supporting data about the leak is collected from the memory, i.e. NVRAM 124 of the CPU 12 or similarly the memory of the CPU 12', and sent to the cloud or a computing device. Alternatively, data is collected in a memory located externally to the CPU 12 or the CPU 12', as the case may be. The probability of a leak, i.e. degree of confidence, is calculated using Bayes' theorem, in accordance with an embodiment of the invention. Conditional probabilities are used to eliminate false alarms. That is, assuming the probability of a leak is the probability of having a leak over the probability of not having a leak, i.e. P(A/B), is equal to the probability of not having a leak divided by the probability of having a leak, i.e. P(B/A) times the probability of having a leak, i.e. P(A), divided by the probability of not having a leak, i.e. P(B), as expressed by the shorthand of this equation below:

$$P(A/B)=(P(B/A)P(A))/P(B) \qquad \text{Eq. (1)}$$

If at 910, it is determined that no leak is detected, the process goes back to the step 902.

Figure 10:
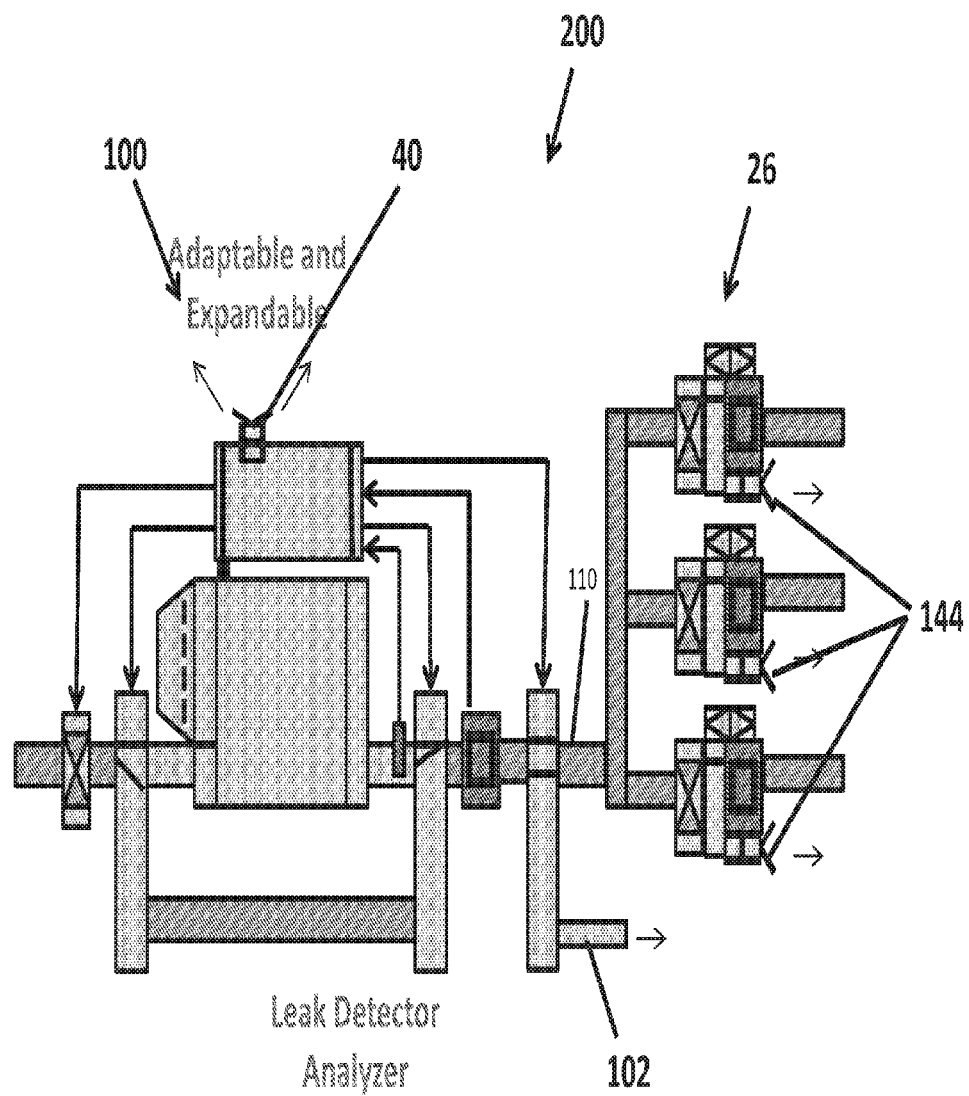
FIGS. 10-12 show further examples of the use of the devices 10, 100 and 26, in multi-functional leak detection settings.
Figure 11:
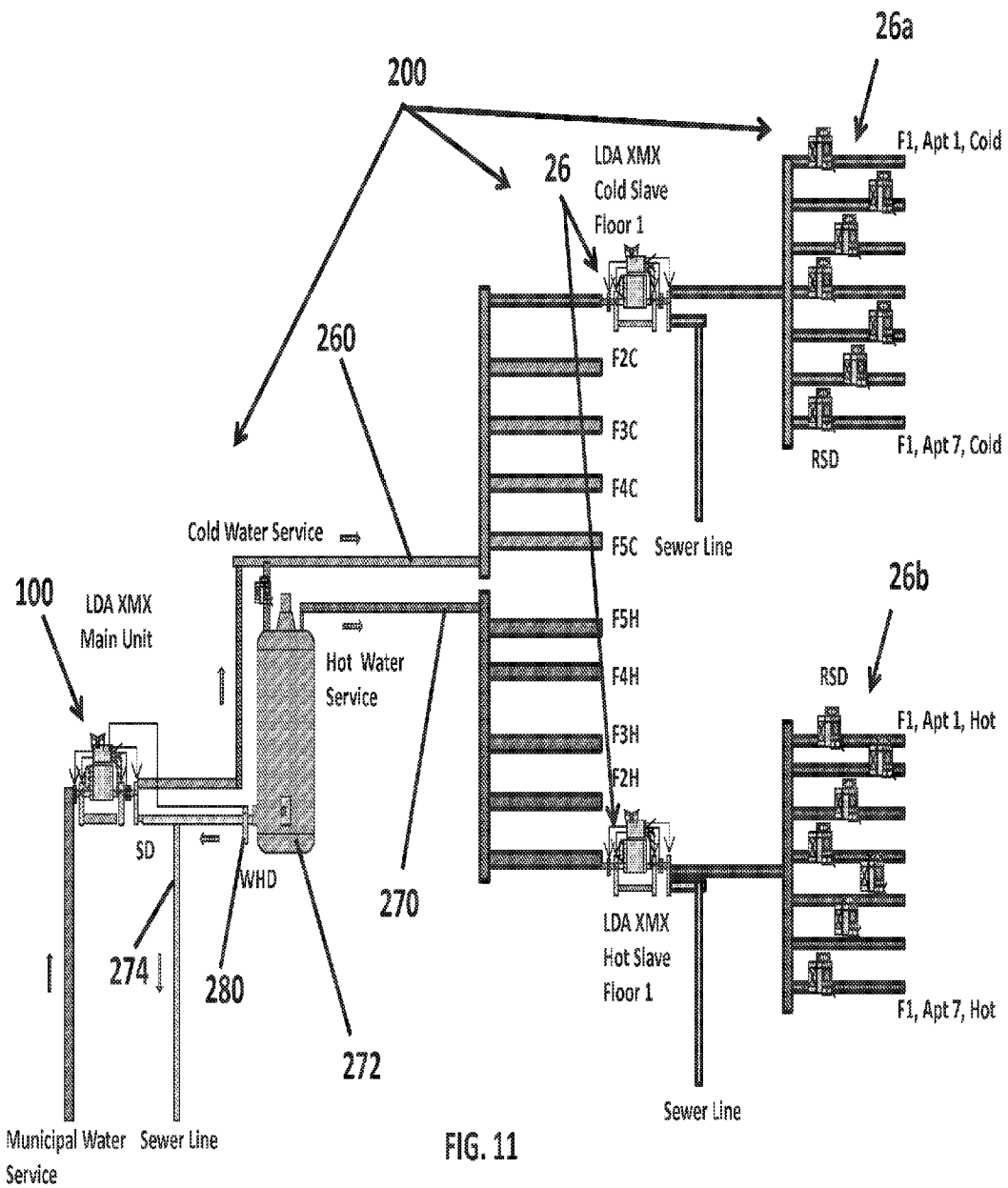
Figure 12:
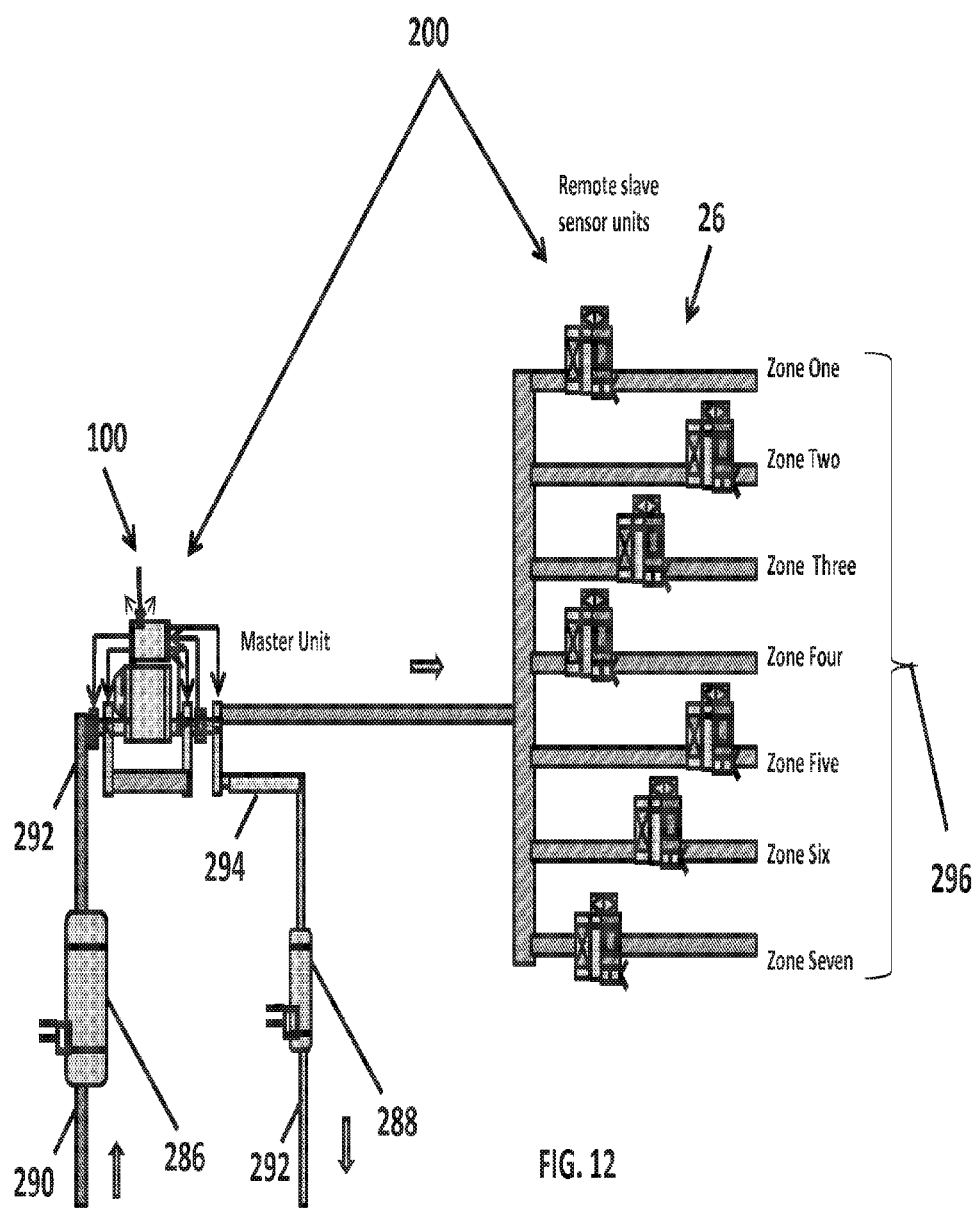

FIGS. 10-12 show further examples of the use of the devices 10, 100 and 26, in multi-functional leak detection settings. One of the current problems with the detection and reporting of leaks is false alarms. This is in part due to a type of detection that signals the presence or lack of a leak, i.e. a binary reporting. Whereas, the devices 10 and 26 are far more flexible and can detect the building up of pressure or the decrease of pressure as a function of time and report the same and therefore non-binary. FIG. 10 is one such application in a multi-functional setting.

FIG. 10 shows a multi-functional leak detector/analyzer system 200, in accordance with an embodiment of the invention. The system 200, similar to that of prior figures, shows the device 100 connected to three devices 26 through the pipe 110. While one device 100 is employed, three devices 26 are employed partly to take advantage of the lower costs associated with the devices 26. That is, rather than having three of the devices 100 or 10, which would increase costs, one such device is used as the master and multiple devices 26 are used as slaves to the device 100. Accordingly, each of the devices 26 perform limited analysis and primarily have the job of collecting data and transmitting the same to the device 100 for analysis and decision making.

Exemplary applications of the system 200 include placing each of the devices 26 in a different location within a single family house while placing the device 100 in a different location. Each device 26 can be placed in a location where leaks are most likely to occur, such as the faucet plumbing, pool and the like.

Among the information transmitted back to the device 100, the devices 26 report a detected leak. The device 100 can identify which of the devices 26 is detecting the leak. The identify of the device 26 is known to the device 100 using various methods and embodiments of the invention, one of which is for the device 100 to assign a number or character or another type of identifier to each of the devices 26, which it uses as a part of the information it transmits to the devices through wireless or wired communication and similarly, it receives such an identifier from the devices 26 when the latter are reporting back. An exemplary device 26 identifier might be unit 1, floor 1, cold side or unit 35, floor 7, hot side.

Upon the reporting of a leak by one or more of the devices 26, the device 100 shuts off the flow of liquid through the leaky devices while continuing to allow liquid to flow through the remaining device(s) of the devices 26. Thus, zones that the devices 26 are monitoring where no leak has been detected continue to monitor the zone while the liquid through zones detected to have leaks by the devices 26 are isolated preventing the leaks from becoming yet larger and ultimately resulting in broken structures and pipes.

Other exemplary applications of the system 200 include apartment buildings, where one of the devices 26 is placed in each of the apartments, commercial buildings where one of the devices 26 is placed on each floor or each suite of the building, business, such as retail, agriculture and irrigation where each of the devices 26 is placed in a different zone of the farm/land.

The system 200 can conduct controlled self-drains through the drain 102 when required such as to rid itself of undesirable liquid, for example sewage waste. Self-drains are typically initiated and performed under the control of the device 100. It is contemplated that the devices 26 may also have their own drains and can accordingly self-drain without the aid of the device 100, in certain embodiments of the invention.

Through the transceiver 40, the device 100 is adaptable and expandable in that any group or groups of zones/areas may be monitored by communicating through the transceiver 40. For example, while three devices 26 are shown in FIG. 10, any number or such devices, or sets of such devices, suitable for communication with the device 100 through the transceiver 40 thereof may be employed.

FIG. 11 shows an example of the application of the system 200 in a complex apartment building setting. In this particular application, five floors are monitored and each floor has 7 apartments that are monitored by the device 100. This exemplary application is on a larger scale than those shown and discussed earlier, in that the device 100 receives water from a municipal water service and drains to a sewer line. Further, cold and hot water and independently monitored in that cold water is separated from hot water through the use of a water heater 250. The water heater 250 outputs the hot part of the water received from the municipal water service and this hot water is then provided to half of the devices 26, whereas, cold water, which travels through the path 260 is independently provided to the remaining devices of the devices 26. Hot water travels through the path 270.

The device 100 communicates with the devices 26, which are slaves to the device 100 and one monitors cold water for a floor, such as Floor 1, and the other monitors hot water for Floor 1. While not shown, in FIG. 11, for the sake of clarity of the drawing, it is understood that the remaining four floors may have their own device 26. Each of the devices 26 monitor a set of their own devices 26. For example, the device 26 for cold water monitors a set of devices 26a which include a device 26 for each apartment located on Floor 1. Similarly, the device 26 for hot water, monitors the set of devices 26b, which are seven devices with each device monitoring the hot water of an apartment of Floor 1. Each of the devices 26, in addition to the device 100, have their dedicated sewer line.

In the configuration of FIG. 11, not only is the water supply for each apartment of a floor monitored, the water heater is also monitored by the device 100, through the water heater detector 280 connected between the device 100 and the water heater 272. The water heater 272 can be drained, under the control of the device 100 through the sewer line 274. The water heater 272 is capable of separating hot water from cold water and upon a faulty part, as detected by the water heater detector 280, is disconnected from the devices 26 by being turned off by the water heater detector 280. No water supply by one of the devices 26 results in water supply to the device 26's respective one of the sets of devices 26a and 26b. Additionally, a leak somewhere between the connection of device 100 and the devices 26, hot and cold water supply to Floor 1, is detectable as is a leak in any of the apartments of Floor 1. Upon the detection of a leak, the remaining devices of the devices 26, 26a or 26b, water flow through the associated pipes is cutoff isolating the leak from the water path. Additionally, water usage for each apartment may be monitored, which presents the capability of a landlord to offer incentive for water conservation by each tenant among a slew of other benefits.

FIG. 12 shows yet another application of the system 200, in accordance with an embodiment and method of the invention. In this application, the system 200 is used to detect leaks of and analyze/monitor irrigation farms or golf courses. In the case of farms, the farms are divided into zones, with each zone covering a certain amount of area. The areas the zones cover need not be the same amount of area and can be different areas based on the need for water in that particular area and can therefore be assigned so as to optimize irrigation.

Each of the devices 26 is dedicated to a distinct zone. In the example of FIG. 12, there are 7 devices 26 that monitor/analyze/detect 7 zones. It is clear that any number of zones may be employed. Water comes in through pipe 290 and goes through a supply pump 286) that may be turned on and off depending on the desired water pressure. During seasons of rain, the pump 286 can be adjusted accordingly relative to the seasons of no rain. Water travels through pipe 292 and serves as the intake to the device 100. In this manner, water flow to the device 100 can be controlled through the pump 286, enhancing optimization of the overall system.

The sewer line 294, out of the device 100 is connected to a drain pump 288, which can be turned on and off, as with the pump 286 and can therefore adjust the water flow from the sewer line 294 to the pipe 292, which is a pipe connected to the output of the drain pump 288. In an exemplary process and embodiment, the pipe 292 guides drainage to a main sewer line. Otherwise, the system 200 operates as discussed hereinabove relative to various figures. The device 100 serves as a master to the devices 26. These devices communicate to each other through wireless or wires means and can transmit and receive information between each other or to other devices through the cloud, as can all embodiments discussed and shown herein. The configuration of FIG. 12 provides full control and protection of an irrigation system for farms, golf courses or otherwise.

Accordingly, the system 200 is continuously adaptable and allows for flexible design of liquid management designs, such as but not limited to, for water. Furthermore, through time, usage of the system 200 helps the system 200 to learn of characteristics of the use of liquid and in this manner it is a self-learning system that can fully interact with users or it can work autonomously, for example through communication with the cloud. Furthermore, it is autonomously adaptable to any changes in schedules and prevents false alarms. It autonomously detects, tests, analyzes, quantifies and acts upon excess liquid consumption events, leaks, and broken pipes. It can also autonomously drain pipes in the event of a catastrophic leak, or to autonomously drain one of cold or hot pipes independently of the other or it can do all simultaneously. The user of such a system is in a position to be able to save cost and valuable resources, such as water and oil as wells as more efficient use of the same.

Figure 13:
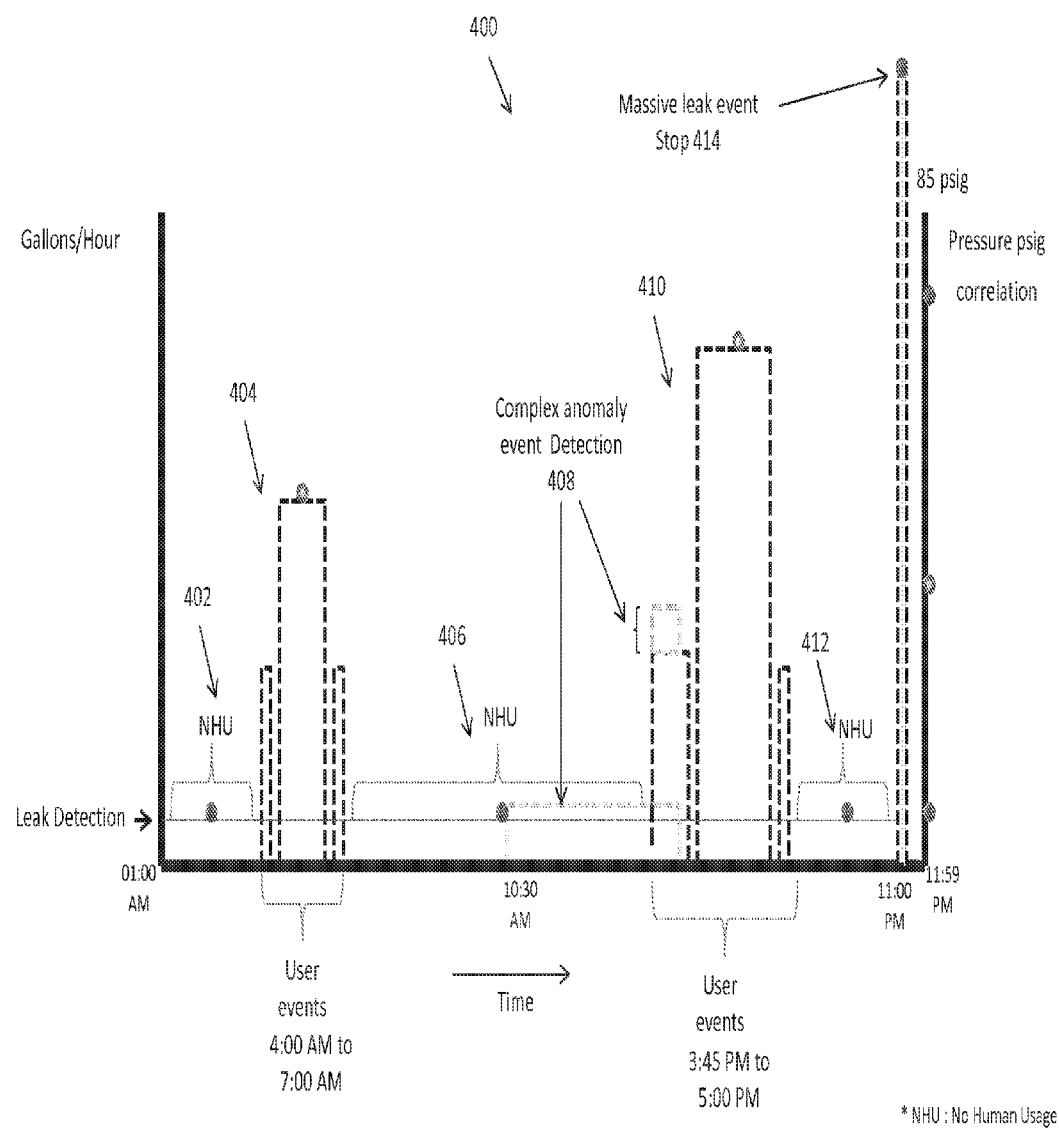
FIG. 13 shows a graph 400 of an exemplary leak detection process throughout a 24-hour period of time for a user of the device 10 or 100, in accordance with the various embodiments and methods of the invention.

FIG. 13 shows a graph 400 of an exemplary leak detection process throughout a 24-hour period of time for a user of the device 10 or 100, in accordance with the various embodiments and methods of the invention. The x-axis represents a 24-hour period of time starting from the time of the last detection.

Using the example of water as liquid, in the early hours of the morning, shown at 402 in FIG. 13, the user has no need for water, thus, there is a period of no-human usage (NHU). Sometime later in time, i.e. in the morning, shown at 404, the user utilizes water and during late morning, once again has no need for water, i.e. NHU period, as shown at 406 except that during this NHU period, a complex anomaly event is detected, shown 408. An example of this complex anomaly event is but need not be a leak. Other examples of such an event are an earthquake, flood or fire.

In the case where the complex anomaly event is a leak, due to the duration of the leak, the leak becomes a major (large) leak sometime in the early afternoon. This leak is a complex anomaly event and clearly unknown to the user. Next, at 408, the user's water usage goes up during the early part of the evening, followed by less use and finally, no use at 412. At 414, later in the night, the leak at 408 becomes a massive leak event. Use of the device 10/100 results in the leak while it was fairly minor at 408, an example of which is shown and discussed relative to FIG. 6 and the user is isolated from the leak before the leak becomes a catastrophe at 414, as shown and discussed relative to FIG. 7.

The device 10/100 maintains track of the usage periods of time and the non-usage periods of time and over some time, learns a pattern of such usages. Based upon the learned pattern, the device 10/100 can automatically control the flow of liquid, i.e. stop the flow when a non-usage time is expected and turn on the flow of liquid when a usage time is expected. The device 10/100 can learn this and other information for each of the devices 26 and control each device of the devices 26 individually such that liquid flow is, for example, determined per zone or apartment using the examples provided above. Liquid flow control may alternatively be done by the devices 26 controlling their individual liquid flows locally rather than by instructions for another device.

Yet alternatively, the devices 26 may be arranged in a daisy chain configuration. In such a configuration, over a very long pipeline, like that which is used for oil, liquefied natural gas, or water lines, leak of a part of the long pipe may be detected. The leaking part of the pipe would not hold pressure. Such a leak is typically a breakage in the long pipe. To this end, the part of the long pipe with the detected leak may be isolated thereby limiting spill. Learning may be employed for a host of various functions other than those discussed herein and are too numerous to list.

As used herein, the functions of the device 10, as shown and/or discussed herein, apply equally to those of device 100.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What is claimed is:

1. A method of monitoring liquid flow comprising:
    monitoring liquid flow of liquid, including the pressure of the liquid, flowing through a slave analyzer device;
    measuring the pressure of the liquid;
    automatically controlling the liquid flow to a user by stopping the liquid flow, using a first valve, during expected non-usage periods of time and turning the liquid flow on, using the first valve, during expected usage periods of time;
    in a bypass mode, starting with a pressurizing mode wherein the first valve is in an open position and a second valve is in a closed position and a tank with a pump, configured to reserve liquid, is in an 'on' position, the first valve controlling liquid flow into the tank with a pump and the second valve controlling liquid flow from the tank with a pump to the user; and
    reading a pressure of the liquid in the tank with a pump, using a sensor and upon reaching a desired pressure of the liquid in the tank with a pump, as sensed by the sensor, a central processing unit (CPU) causing the tank with a pump and the first valve to close and the second valve to open thereby allowing the liquid to flow to a user,
    wherein upon detection of the presence of a leak, the CPU causing the first valve to close to cause preservation of the liquid in the tank with the pump and in the absence of detection of a leak, the CPU causing the first and second valves to open to route the liquid through at least one pipe located externally to the tank with a pump such that the liquid bypasses flowing through the tank with a pump.

2. The method of monitoring liquid flow, as recited in claim 1, further including more than one slave analyzer device located remotely to one another and to a master analyzer device controlling the liquid flow at different locations independently of one another.

3. The method of monitoring liquid flow, as recited in claim 1, further including learning, through passage of time, time periods of liquid usage and time periods of liquid non-usage.

4. The method of monitoring liquid flow, as recited in claim 1, further including detecting time periods of usage and time periods of non-usage of the liquid through the measured pressure and learning a pattern associated with the time periods of usage and the time periods of non-usage, wherein the automatically controlling the liquid flow is based upon the learned pattern.

5. The method of monitoring liquid flow, as recited in claim 1, wherein when the tank with a pump is turned 'on', the liquid is prevented from flowing through the second valve to the user.

6. The method of monitoring liquid flow, as recited in claim 1, further including detecting the presence of a leak by sensing the measure liquid pressure and the monitored liquid flow being below that which is normally expected in the absence of a leak.

7. The method of monitoring liquid flow, as recited in claim 1, wherein a pump motor stopping operating upon detection of a predetermined liquid pressure.

8. The method of monitoring liquid flow, as recited in claim 1, wherein a set of slave analyzer devices forming a zone and monitoring more than one zone.

9. The method of monitoring liquid flow, as recited in claim 1, wherein in the bypass mode, using the tank with a pump for pressure testing.

10. The method of monitoring liquid flow, as recited in claim 1, further including performing pressure testing using the tank with a pump during which causing the first valve to be and remain closed and the second valve to be and remain opened and applying liquid pressure to pressurize the tank with a pump.

11. The method of monitoring liquid flow, as recited in claim 1, wherein the first valve controls flow of the liquid to the at least one pipe and the second valve controls the flow of the liquid from the at least one pipe to the user.

* * * * *